(12) United States Patent
You (10) Patent No.: US 9,749,170 B2
(45) Date of Patent: Aug. 29, 2017

(54) METHOD AND APPARATUS FOR GENERATING SAMPLING FREQUENCY

(71) Applicant: Electronics and Telecommunications Research Institute, Daejeon (KR)

(72) Inventor: Dukhyun You, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/722,281

(22) Filed: May 27, 2015

(65) Prior Publication Data

US 2015/0349943 A1    Dec. 3, 2015

(30) Foreign Application Priority Data

May 30, 2014    (KR) .................. 10-2014-0066483

(51) Int. Cl.
*H04L 7/00* (2006.01)
*H04L 27/26* (2006.01)
*H04L 27/00* (2006.01)

(52) U.S. Cl.
CPC ...... *H04L 27/2657* (2013.01); *H04L 27/0014* (2013.01); *H04L 27/2662* (2013.01); *H04L 27/2689* (2013.01); *H04L 2027/0026* (2013.01); *H04L 2027/0065* (2013.01)

(58) Field of Classification Search
CPC ..... H04L 2027/0026; H04L 2027/0065; H04L 27/0014; H04L 27/2657
USPC .................................................. 375/355, 316
See application file for complete search history.

(56) References Cited

U.S. PATENT DOCUMENTS

| | | | |
|---|---|---|---|
| 6,944,251 B1 * | 9/2005 | Nanba ................ | G11B 20/1403 375/355 |
| 7,308,034 B2 | 12/2007 | Jeon et al. | |
| 2008/0240321 A1 * | 10/2008 | Narus ............... | G01R 31/31726 375/356 |
| 2014/0340780 A1 * | 11/2014 | Zhang ................... | G11B 20/16 360/51 |

* cited by examiner

*Primary Examiner* — Leila Malek
(74) *Attorney, Agent, or Firm* — William Park & Associates Ltd.

(57) ABSTRACT

A method and apparatus for generating a sampling frequency are provided. A signal is generated, of which frequency is a predetermined multiple of a reference clock, and a frequency offset in a channel is extracted from the entire frequency offset. The amount of shift is calculated by dividing the extracted frequency offset by a predetermined value, and a final sampling frequency is obtained by shifting the frequency of the generated signal by the amount of shift.

18 Claims, 7 Drawing Sheets

METHOD AND APPARATUS FOR GENERATING SAMPLING FREQUENCY

CROSS-REFERENCE TO RELATED APPLICATION

This application claims priority to and the benefit of Korean Patent Application No. 10-2014-0066483 filed in the Korean Intellectual Property Office on May 30, 2014, the entire contents of which are incorporated herein by reference.

BACKGROUND OF THE INVENTION (a) Field of the Invention

The present invention relates to sampling frequency generation. More particularly, the present invention relates to a method and apparatus for generating a sampling frequency used for signal processing in mobile communication.

(b) Description of the Related Art

In a communication system, a transmitting device converts baseband digital data into an analog baseband signal using a DAC (digital-to-analog converter), and up-converts the analog baseband signal into an RF (radio frequency) center frequency and transmits it. Such an RF transmission signal is received by a receiving device. The receiving device down-converts the received RF signal into an analog baseband signal, and samples the analog baseband signal and converts it into a digital baseband signal using an ADC (analog-to-digital converter).

For ideal communication, sampling frequency must satisfy a predetermined condition. That is, the clock of the DAC of the transmitting device and the clock of the ADC of the receiving device must match each other. If this condition is not satisfied, aliasing can occur in a particular frequency range depending on the bandwidth of a baseband signal according to the Nyquist Sampling Theorem, causing a problem in proper data transmission. Normally, the operation of measuring such frequency error is done in the digital domain.

However, it is very difficult to measure sampling frequency errors unless the analog domain supports specific hardware, because the clock of the digital domain is generally used as a sampling clock. Therefore, the receiving device must be initially designed to make sure that the analog domain provides as accurate values of sampling frequency as possible at the time of sampling frequency generation. However, the receiving device (e.g., a terminal) generally uses a reference clock, which is less accurate. This limits the ability to provide accurate values of sampling frequency.

Accordingly, there is a need to employ a negative feedback loop which uses a base station's clock as a criterion, in order to generate a highly accurate and stable clock. However, since an RF center frequency error compensation circuit is already realized in the negative feedback loop, a sampling frequency generation circuit is generally designed to use the RF center frequency error compensation circuit.

That is, the system is designed in such a way that both sampling frequency and RF center frequency, which are set to be multiples of each other, are multiples of the terminal's reference clock. Also, the sampling frequency can be compensated automatically once an RF frequency error is measured and compensated for, which is a widely-used method.

Using this method, the RF center frequency is synchronized with a signal received by the terminal, but the sampling frequency is different from the value received by the base station, which is likely to cause aliasing. Particularly, sampling frequency changes in proportion to frequency error occur in a channel, caused by the Doppler effect. The higher the sampling frequency and the moving velocity of the terminal, the greater the amount of change in sampling frequency. In view of the recent trend toward higher communication throughput by the use of higher bandwidth and toward support for higher mobility, it is not appropriate to generate sampling frequency based upon the above method.

Normally, a modem receives a sampling frequency and uses it as a clock signal for a digital circuit. However, this method involves designing the digital circuit in view of changes in sampling frequency in a high-velocity environment, which can be a significant burden to design.

In addition, if a guard band is not large enough compared with sampling frequency errors, aliasing will occur. In the worst case, aliasing may occur in a frequency band where channel distortion measurement is made, interfering with proper frequency synchronization.

Accordingly, it is difficult to get a stable sampling frequency under a high-velocity mobile environment only by measuring an error and compensating for it as described above, while maintaining sampling frequency and RF center frequency to be multiples of each other.

Therefore, generating a sampling clock in a way that it is kept at a constant frequency, regardless of moving velocity, rather than by the above-described method, will get the modem closer to a more ideal design solution. To this end, a new method and apparatus for achieving sampling frequency that are different from the existing ones are needed.

SUMMARY OF THE INVENTION

The present invention has been made in an effort to provide a method and apparatus for generating a sampling frequency that can generate a sampling clock in a way that is kept at a constant frequency, regardless of the moving velocity of a terminal.

An exemplary embodiment of the present invention provides a method for generating a sampling frequency in order for a terminal to sample a received signal, the method including: extracting a frequency offset in a channel from an entire frequency offset; calculating an amount of shift by dividing the extracted frequency offset by a predetermined value; and obtaining a final sampling frequency by shifting the frequency of a predetermined signal by the amount of shift.

The method may further include generating a signal of which frequency is a predetermined multiple of a reference clock, wherein the generated signal may be used as the predetermined signal. In the generating of a signal, a clock received from a base station may be used as the reference clock.

The extracting of a frequency offset may include the terminal extracting a frequency offset for each of multiple links connected to multiple base stations.

The calculating of the amount of shift may include calculating the amount of shift for each link by dividing the frequency offset for each link by a predetermined value. The obtaining of a sampling frequency may include obtaining a sampling frequency for each link by shifting the frequency of the generated signal by the amount of shift for each link.

The obtaining of a sampling frequency may further include obtaining a final sampling frequency by summing the sampling frequencies for respective links and dividing the sum by a predetermined constant. The predetermined constant may be the number of links.

Another exemplary embodiment of the present invention provides an apparatus for generating a sampling frequency in order for a terminal to sample a received signal, the apparatus including: a first frequency subtractor that receives sampling frequency signals generated based on reference frequencies for multiple links and produces a sum of the sampling frequency signals; a frequency divider that divides the frequency signal output from the first frequency subtractor by a predetermined value and produces an output; and a second frequency subtractor that performs an operation on the signal output from the frequency divider and the sampling frequency for each link, and produces a final sampling frequency signal for each link.

The first frequency subtractor may obtain a sampling frequency signal by shifting the sampling frequency signals for respective links by a value obtained by dividing a channel frequency offset by a predetermined constant.

The first frequency subtractor may include: a first multiplier that produces a first sampling frequency signal for a first link multiplied by a second sampling frequency signal for a second link; a second multiplier that multiplies the first sampling frequency signal shifted by a predetermined value by the second sampling frequency signal shifted by a predetermined value and produces an output; and an adder that produces a sum of the signal output from the first multiplier and the signal output from the second multiplier.

The apparatus may further include: a first delay unit that produces the first sampling frequency signal delayed by a predetermined value and outputs the same to the second multiplier; and a second delay unit that produces the second sampling frequency signal delayed by a predetermined value and outputs the same to the second multiplier.

The sampling frequency signal for each link may be a signal of which frequency is a predetermined multiple of a reference clock received from a base station.

The second frequency subtractor may subtract the first sampling frequency input to the first frequency subtractor from the signal output from the frequency divider and produce a final sampling signal for the first link, and subtract the second sampling frequency signal input to the first frequency subtractor from the signal output from the frequency divider and produce a final sampling signal for the second link.

The frequency divider may divide a signal by a predetermined value corresponding to the number of links.

Yet another exemplary embodiment of the present invention provides an apparatus for generating a sampling frequency in order for a terminal to sample a received signal, the apparatus including: a first frequency subtractor that receives sampling frequency signals generated based on reference frequencies for multiple links and produces a sum of the sampling frequency signals; and a frequency divider that divides the frequency signal output from the first frequency subtractor by a predetermined value and produces an output, the first frequency subtractor including: a first multiplier that produces a first sampling frequency signal for a first link multiplied by a second sampling frequency signal for a second link; a second multiplier that multiplies the first sampling frequency signal shifted by a predetermined value by the second sampling frequency signal shifted by a predetermined value and produces an output; and a subtractor that performs a subtraction on the signal output from the first multiplier and the signal output from the second multiplier.

The first link and the second link may operate as a pair. The sampling frequency signal for each link may be a signal of which frequency is a predetermined multiple of a reference clock received from a base station. The frequency divider may divide a signal by a predetermined value corresponding to the number of links.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a method and apparatus for generating a sampling frequency according to an exemplary embodiment of the present invention will be described with reference to the drawings.

Figure 1:
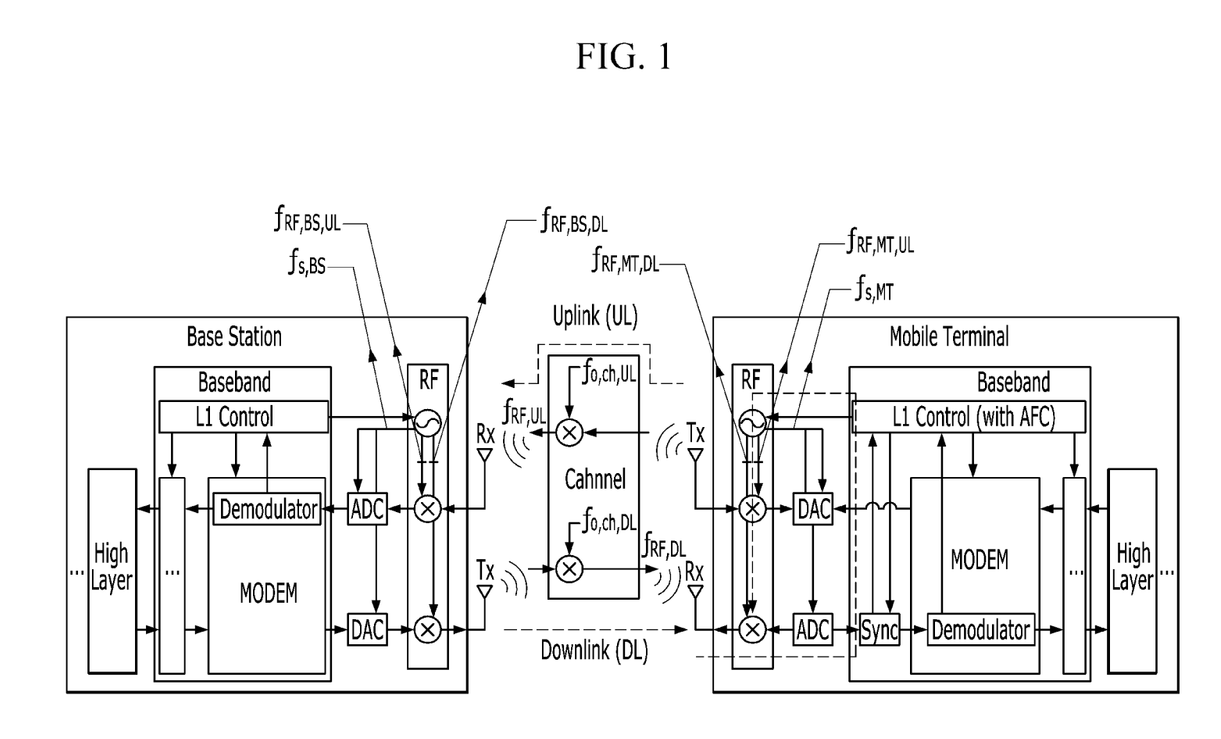
FIG. 1 is a view showing the use of a negative feedback loop in a communication system.

FIG. 1 is a view showing the use of a negative feedback loop in a communication system.

As shown in the attached FIG. 1, when a base station and a terminal communicate with each other, the sampling frequency used for signal reception must satisfy the following condition for ideal communication:

$$f_{s,BS}(t) = f_{s,MT}(t) \qquad \text{(Equation 1)}$$

where $f_{s,BS}(t)$ indicates the sampling frequency of the base station, and $f_{s,MT}(t)$ indicates the sampling frequency of the terminal.

That is, the clock of a DAC (digital-to-analog converter) at the time of transmission (Tx) and the clock of an ADC (analog-to-digital converter) at the time of reception (Rx) must match each other.

To this end, a negative feedback loop using the base station's clock as a criterion is employed. In the negative feedback loop, an RF (radio frequency) center frequency error compensation circuit C1 is used, as shown in FIG. 1. Using the RF center frequency error compensation circuit C1, a sampling frequency generation circuit can be realized. That is, as in the following Equation 2, sampling frequency and RF center frequency are set to be multiples of each other.

$$f_{REF}(t) = \frac{f_{RF}(t)}{N} = \frac{f_s(t)}{M} \quad \text{(Equation 2)}$$

$$f_s(t) = \frac{f_{RF}(t)}{O} = \frac{f_{RF}(t)}{\frac{N}{M}}$$

Herein, $f_{REF}(t)$ indicates RF center frequency, and $f_s(t)$ indicates sampling frequency. O indicates the reference clock of the terminal, and N and M indicate a multiple.

As in the above Equation 2, sampling frequency and RF center frequency are set to be multiples of each other, and both sampling frequency and RF center frequency are set to be multiples of the reference clock of the terminal. Then, sampling frequency is compensated automatically once an RF center frequency error is measured and compensated for.

The process for compensating the RF center frequency is as follows.

In the terminal, RF center frequency compensation is performed in order to make the center frequency of a received RF signal and the center frequency to be used for down-conversion at the time of reception (Rx) match each other.

If the center frequency of a received RF signal and the center frequency to be used for down-conversion at the time of reception (Rx) RF signal do not match each other, the center frequency of a down-converted signal does not become zero. Thus, the constellation of every received packet is rotated the same amount relative to every frequency component. Accordingly, compared to a transmitted signal, a signal received at the baseband will have an RF center frequency error, thus shifting the constellation by about $\phi(t)$. Accordingly, an error will occur while demodulating baseband data.

Hence, a reference signal resource space (a space defined by a specific frequency and a specific period of time) in the received signal is extracted and compared with the reference signal to measure a frequency error, and the measured frequency error is distributed over the entire resource space. As a result, compensation is made in a direction opposite to the measured frequency error: that is, the constellation is shifted by $-\phi(t)$, ending up in the same constellation as the transmitted signal. At this point, the frequency error affects $\phi(t)$, which can be quantitatively expressed by Equation 3:

$$\Phi(t) = \int_0^\tau 2\pi f_0(t) dt + \Phi_0 \quad \text{(Equation 3)}$$

where $f_0(t)$ indicates a frequency error.

The frequency components for downlink DL in FIG. 1 are quantitatively expressed as follows. A description will be made only for downlink, because a clock signal generated via downlink can be used as the sampling frequency for uplink.

First, a terminal moving at a velocity lower than a set level will be described.

In FIG. 1, $f_{RF,BS,DL}(t)$ indicates the downlink (DL) RF frequency of the base station, which can be quantitatively expressed as follows.

$$f_{o,RF,DL}(t) = f_{RF,BS,DL}(t) - f_{RF,MF,DL}(t) \quad \text{(Equation 4)}$$

$$= N(f_{REF,BS}(t) - f_{REF,MT}(t))$$

$$\sim f_{o,drift}(t)$$

In FIG. 1, $f_{o,ch,DL}(t)$ indicates a frequency error that occurs in a downlink channel, and $f_{o,ch,DL}(t)$ at low velocity can be quantitatively expressed as follows.

$$f_{o,ch,DL}(t) = 0 \quad \text{(Equation 5)}$$

In FIG. 1, $f_{o,DL}(t)$ indicates a downlink frequency error, and $f_{o,DL}(t)$ at a low velocity can be quantitatively expressed as follows.

$$f_{o,DL}(t) = f_{o,RF,DL}(t) \quad \text{(Equation 6)}$$

The above downlink frequency error components are fed back from the terminal of FIG. 1 to the RF side via L1 Control (AFC: auto frequency control). Hereupon, the RF center frequency at the time of reception (Rx) can be varied by controlling the frequency of an RF reference clock (e.g., a PLL (phase-locked loop) reference clock). According to the above Equation 5, if the terminal is moving at a low velocity, frequency error components caused by a channel is zero, which gives the following equations.

The following Equation 7 represents the reference frequency during a steady state.

$$f_{REF,MT,DL}(t+\delta) = f_{REF,MT,DL}(t) + \frac{f_{o,DL}(t)}{N} \quad \text{(Equation 7)}$$

$$= f_{REF,MT,DL}(t) + \frac{N(f_{RES,BS}(t) - f_{REF,MT}(t))}{N}$$

$$= f_{RES,BS,DL}(t)$$

Herein, $f_{RF,MT,DL}(t)$ indicates the downlink RF frequency of the terminal.

The following Equation 8 represents the RF center frequency during a steady state.

$$f_{RF,MT,DL}(t+\delta) = Nf_{REF,MT,DL}(t+\delta) \quad \text{(Equation 8)}$$

$$= Nf_{REF,BS,DL}(t)$$

$$= f_{RF,BS,DL}(t)$$

The following Equation 9 represents the sampling frequency during a steady state.

$$f_{s,MT,DL}(t+\delta) = Mf_{REF,MT}(t+\delta) \quad \text{(Equation 9)}$$

$$= Mf_{REF,BS}(t)$$

$$= f_{s,BS}(t)$$

Based upon the above Equations 7 to 9, both the sampling frequency and RF center frequency of the terminal are synchronized with those of the base station, thus allowing for ideal communication.

However, if the terminal is moving at a higher velocity than the set level, the following equations are given.

If the terminal is moving at a high velocity, a channel frequency error $f_{o,ch,DL}(t)$ can be represented as follows.

$$f_{o,ch,DL}(t) = f_{o,doppler,DL}(t) \propto \frac{vf_{RF}}{c} \quad \text{(Equation 10)}$$

If the terminal is moving at a high velocity, a downlink frequency error $f_{o,DL}(t)$ can be represented as follows.

$$\begin{aligned}
f_{o,DL}(t) &= f_{RF,DL}(t) - f_{RF,MT,DL}(t) \quad \text{(Equation 11)}\\
&= f_{RF,BS,DL}(t) + f_{o,ch,DL}(t) - f_{RF,MT,DL}(t)\\
&= f_{o,RF,DL}(t) + f_{o,ch,DL}(t)
\end{aligned}$$

Accordingly, it can be seen that the following equations are given for a steady state.

The following Equation 12 represents the reference frequency during a steady state when the terminal is moving at a high velocity.

$$\begin{aligned}
f_{REF,MT}(t+\delta) &= f_{REF,MT}(t) + \frac{f_{o,DL}(t)}{N} \quad \text{(Equation 12)}\\
&= f_{REF,MT}(t) + \\
&\quad \frac{N(f_{REF,BS}(t) - f_{REF,MT}(t)) + f_{o,ch,DL}(t)}{N}\\
&= f_{REF,BS}(t) + \frac{f_{o,ch,DL}(t)}{N}
\end{aligned}$$

The following Equation 13 represents the RF reference frequency during a steady state when the terminal is moving at a high velocity.

$$\begin{aligned}
f_{RF,MT,DL}(t+\delta) &= N f_{REF,MT}(t+\delta) \quad \text{(Equation 13)}\\
&= N\left(f_{REF,BS}(t) + \frac{f_{o,ch,DL}(t)}{N}\right)\\
&= f_{RF,BS,DL}(t) + f_{o,ch,DL}(t)
\end{aligned}$$

The following Equation 14 represents the sampling frequency during a steady state when the terminal is moving at a high velocity.

$$\begin{aligned}
f_{s,MT}(t+\delta) &= M f_{REF,MT}(t+\delta) \quad \text{(Equation 14)}\\
&= M\left(f_{REF,BS}(t) + \frac{f_{o,ch,DL}(t)}{N}\right)\\
&= f_{s,BS}(t) + \frac{f_{o,ch,DL}(t)}{O}\\
&\propto f_{s,BS}(t) + \frac{vf_{RF,BS,DL}(t)/c}{\frac{f_{RF,BS,DL}(t)}{f_{s,BS}(t)}}\\
&\propto \left(1 + \frac{v}{c}\right) f_{s,BS}(t)
\end{aligned}$$

Based upon these equations, it can be concluded that, while the sampling frequency is synchronized with a signal received by the terminal, the sampling frequency is different from that of the base station, thus causing aliasing. Particularly, it can be seen that the sampling frequency changes in proportion to a frequency error in a channel, caused by the Doppler effect. The higher the sampling frequency and the moving velocity of the terminal, the greater the amount of change in sampling frequency.

Accordingly, it is difficult to get a stable sampling frequency under a high-velocity mobile environment by only measuring an RF center frequency error and compensating for it as described above, while maintaining the sampling frequency and RF center frequency to be multiples of each other.

In the exemplary embodiment of the present invention, a sampling clock is generated such that it is kept at a constant frequency, regardless of the moving velocity of the terminal.

Figure 2:
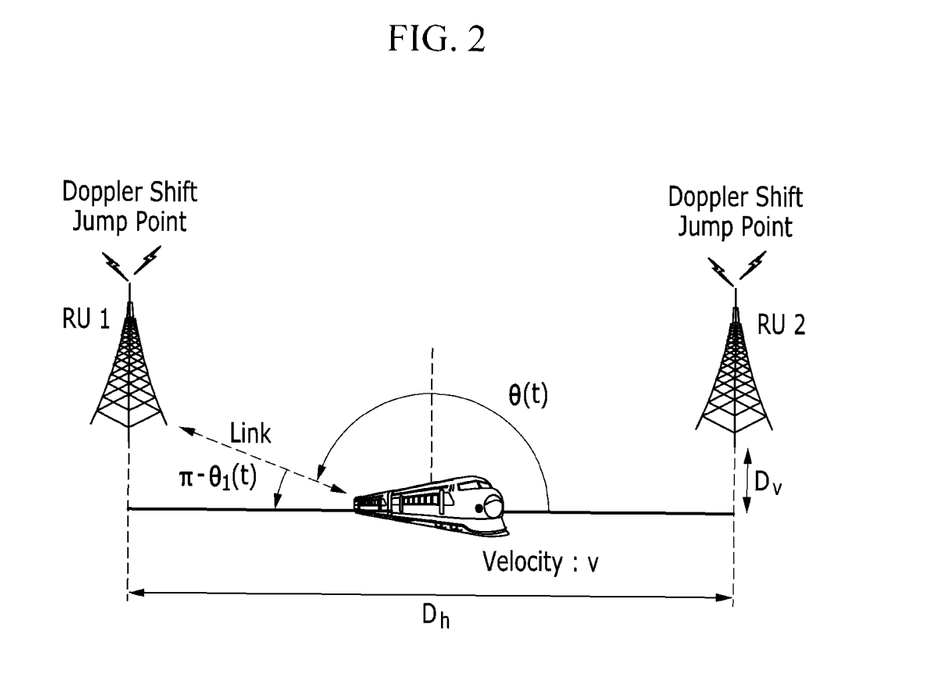
FIG. 2 is a view showing a high-velocity mobile environment according to an exemplary embodiment of the present invention.

FIG. 2 is a view showing a high-velocity mobile environment according to an exemplary embodiment of the present invention.

The attached FIG. 2 illustrates a scenario (LOS (Line of Sight)) considered under a high-velocity mobile environment, where the Doppler effect can be quantitatively expressed as follows.

$$f_{o,ch,DL}(t) = f_{o,doppler,DL}(t) = f_{dmax,DL} \cdot \cos\theta(t) \quad \text{(Equation 15)}$$

$$f_{dmax,DL} = \frac{v \cdot f_{RF,BS,DL}}{c}$$

Referring to the above Equation 15, it can be seen that, unlike in a low-velocity mobile environment, the frequency changes due to a Doppler shift in a high-velocity mobile environment as a signal passes through a channel. It can be seen that this Doppler effect is given by functions of the location parameter (cos component) and velocity parameter (v) between the terminal and the base station.

Based upon the above Equation 15, Equation 14 can be re-expressed as the following Equation 16.

$$\begin{aligned}
f_{s,MT,conv}(t+\delta) &= f_{s,BS}(t) + \frac{f_{o,ch,DL}(t)}{O} \quad \text{(Equation 16)}\\
&= \left(1 + \frac{v}{c}\cos\theta(t)\right) f_{s,BS}(t)
\end{aligned}$$

Meanwhile, in an NLOS (Non-Line of Sight) environment, a frequency change appears as a Doppler frequency spread, instead of the Doppler shift. Although the Doppler frequency spread in the NLOS environment can be corrected by a statistical approach, this increases the complexity of the correction circuit.

In a high-velocity mobile environment, communication is normally performed in a situation where LOS is guaranteed. Hence, in the exemplary embodiment of the present invention, a frequency change caused by the Doppler shift is taken into consideration. However, provided that a frequency change is measured at a reliable level, and in the NLOS environment, the method according to the exemplary embodiment of the present invention can be applied.

In the exemplary embodiment of the present invention, a negative feedback loop is used to get a stable sampling frequency. Otherwise, every terminal will operate at different frequencies, and will be subject to the constraint that an oscillator for generating each terminal's reference clock must be highly precise to get each terminal to operate. In view of this constraint, the exemplary embodiment of the present invention uses, but is not limited to, a negative feedback loop.

Figure 3:
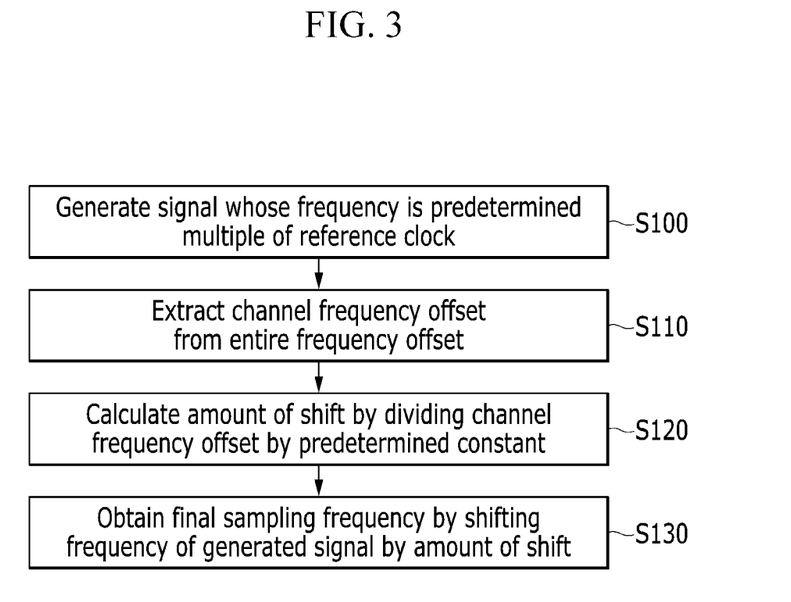
FIG. 3 is a view showing the concept of a method for generating a sampling frequency according to an exemplary embodiment of the present invention.

FIG. 3 is a view showing the concept of a method for generating a sampling frequency according to an exemplary embodiment of the present invention. Here, only the receiving process is explained.

As shown in the attached FIG. 3, an RF signal received via a certain channel is down-converted into an analog baseband signal, and the analog baseband signal is sampled and converted into a digital baseband signal by an ADC (analog-to-digital converter).

To set the sampling frequency of the ADC to match the sampling frequency of the base station, a negative feedback loop using the base station's clock as a criterion is used. To get a stable sampling frequency, a signal is generated, of which frequency is a predetermined multiple of the base station's clock, i.e., a reference clock (S100).

Then, a frequency offset (Doppler frequency offset) produced in the channel is extracted from the entire frequency offset (S110), and the amount of shift is calculated by dividing the extracted frequency offset by a predetermined constant (O) (S120). A final sampling frequency is obtained by shifting the frequency of the generated signal by the amount of the shift (S130). This can be given by the following equation.

(step 1)   (Equation 17)

$$f_{o,DL}(t) = f_{RF,DL}(t) - f_{RF,MT,DL}(t)$$

(step 2)

$$f_{REF,MT}(t+\delta) = f_{REF,MT}(t) + \frac{f_{o,DL}(t)}{N}$$
$$= f_{REF,BS}(t) + \frac{f_{o,ch,DL}(t)}{N}$$

(step 3)

$$f_{s,MT,conv}(t+\delta) = Mf_{REF,MT}(t+\delta)$$
$$= M\left(f_{REF,BS}(t) + \frac{f_{o,ch,DL}(t)}{N}\right)$$
$$= f_{s,BS}(t) + \frac{f_{o,ch,DL}(t)}{O}$$

(step 4)

$$f_{s,MT,proposed}(t+\delta) = f_{s,MT,conv}(t+\delta) - \frac{f_{o,ch,DL}(t)}{O}$$

The process of extracting a frequency offset, i.e., Doppler frequency offset, produced in the channel from the entire frequency offset will be described.

To extract the Doppler frequency offset, the two methods can be used as a rule.

The first method is to extract a Doppler frequency offset when the velocity and location of the terminal are detected based on positioning service. This method can also be applied when there is only one link.

Based upon the velocity (v(t)) and location (cos) of the terminal, the Doppler frequency offset $f_{o,ch,DL}(t)$ can be calculated by the above Equation 15. Then, the calculated Doppler frequency offset is divided by a predetermined constant (O) to calculate the amount of frequency shift.

In this method, a signal in a negative feedback loop may be used as a reference value for the purpose of accuracy in the calculation of the Doppler frequency offset $f_{o,ch,DL}(t)$. At this point, it is necessary to determine the factor that gives the Doppler frequency offset $f_{o,ch,DL}(t)$, compared with the reference value.

The second method is a method of Doppler frequency offset calculation used when the velocity (v(t)) and location (cos) of the terminal are not known. The velocity (v(t)) and location (cos) of the terminal are not known if a positioning service is not provided or is unavailable. In this instance, the channel's frequency offset component cannot be extracted with only one link. Therefore, as shown in FIG. 4, the frequency offset component is extracted using multiple links.

Figure 4:
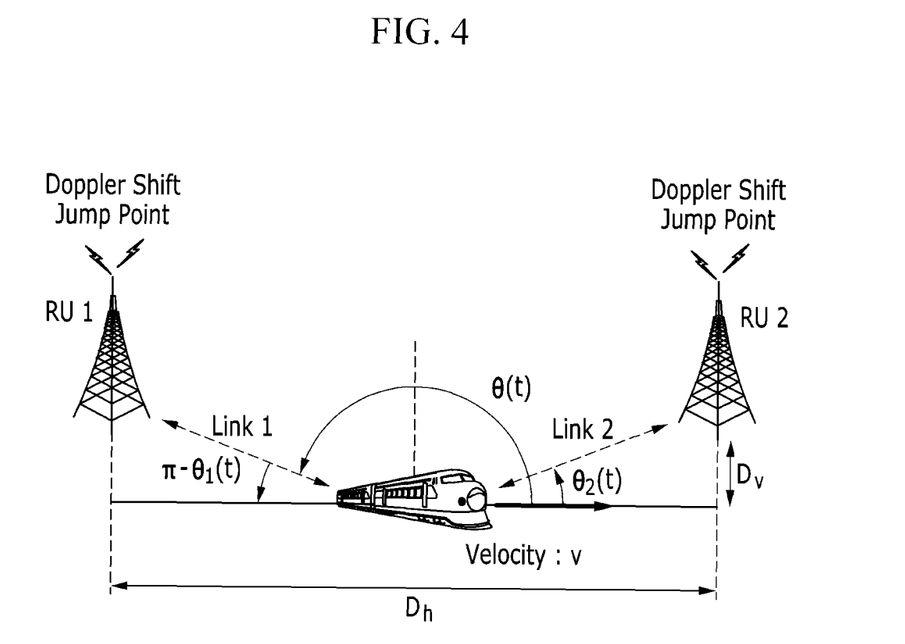
FIG. 4 is an illustration of an environment where multiple links are used for channel frequency offset extraction according to an exemplary embodiment of the present invention.

FIG. 4 is an illustration of an environment where multiple links are used for channel frequency offset extraction according to an exemplary embodiment of the present invention.

As illustrated in FIG. 4, when there is a link between the terminal and a plurality of base stations RU1 and RU2, the channel's frequency error component, i.e., Doppler frequency offset, is extracted using the links Link 1 and Link 2.

The frequency error, i.e., Doppler frequency offset, of each link can be expressed as follows.

Firstly, the first link Link 1 will be described.

$$f_{o,DL1}(t) = f_{RF,DL1}(t) - f_{RF,MT,DL1}(t) \quad \text{(Equation 18)}$$

Herein, $f_{o,DL1}(t)$ indicates the downlink frequency for the first link.

The reference frequency during a steady state for the first link can be expressed as follows.

$$f_{REF,MT,Link1}(t+\delta) = f_{REF,BS,LINK1}(t) + \frac{f_{o,ch,DL1}(t)}{N} \quad \text{(Equation 19)}$$

Herein, $f_{REF,MT,Link1}(t+\delta)$ indicates the reference frequency during a steady state for the first link.

The sampling frequency during the steady state for the first link can be expressed as follows.

$$f_{s,MT,Link1}(t+\delta) = f_{s,BS}(t) + \frac{f_{o,ch,DL1}(t)}{O} \quad \text{(Equation 20)}$$

Herein, $f_{s,MT,Link1}(t+\delta)$ indicates the sampling frequency during a steady state for the first link.

Next, the second link Link 2 will be described.

$$f_{o,DL2}(t) = f_{RF,DL2}(t) - f_{RF,MT,DL2}(t) \quad \text{(Equation 21)}$$

Herein, $f_{o,DL2}(t)$ indicates the downlink frequency for the second link.

The reference frequency during a steady state for the second link can be expressed as follows.

$$f_{REF,MT,Link2}(t+\delta) = f_{REF,BS,LINK2}(t) + \frac{f_{o,ch,DL2}(t)}{N} \quad \text{(Equation 22)}$$

Herein, $f_{REF,MT,Link2}(t+\delta)$ indicates the reference frequency during a steady state for the second link.

The sampling frequency during the steady state for the second link can be expressed as follows.

$$f_{s,MT,Link2}(t+\delta) = f_{s,BS}(t) + \frac{f_{o,ch,DL2}(t)}{O} \quad \text{(Equation 23)}$$

Herein, $f_{s,MT,Link2}(t+\delta)$ indicates the sampling frequency during a steady state for the second link.

The frequency offset for each link is divided by a predetermined value to calculate the amount of shift for each link, and the frequency of the signal generated in the step S100 is shifted by the amount of the shift to obtain the sampling frequency for each link.

If the terminal is moving at a uniform velocity, the cosine component in Equation 15 related to the Doppler effect can be expressed as follows.

$$\cos\theta_1(t) = \begin{cases} \dfrac{v \cdot t}{\sqrt{D_v^2 + (v \cdot t)^2}}, & 0 \leq t \leq \dfrac{D_h}{v} \\ \cos\theta_1(\operatorname{mod}(D_h/v)), & t > \dfrac{D_h}{v} \end{cases} \quad \text{(Equation 24)}$$

$$\cos\theta_2(t) = \begin{cases} \dfrac{D_h/2 - v \cdot t}{\sqrt{D_v^2 + (D_h - v \cdot t)^2}}, & 0 \leq t \leq \dfrac{D_h}{v} \\ \cos\theta_2(\operatorname{mod}(D_h/v)), & t > \dfrac{D_h}{v} \end{cases}$$

Herein, $\cos\theta_1(t)$ indicates the cosine component for the first link, and $\cos\theta_2(t)$ indicates the cosine component for the second link.

Figure 5:
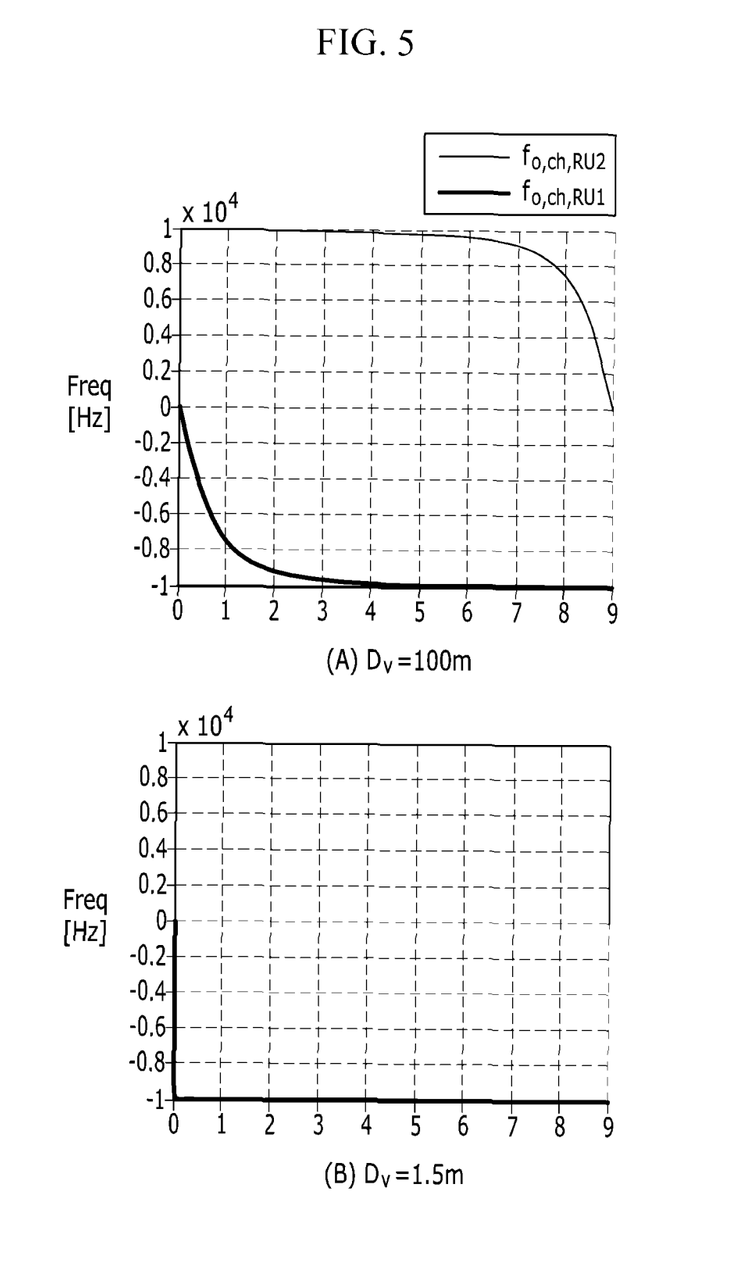
FIG. 5 is a view showing temporal changes in Doppler frequency error according to an exemplary embodiment of the present invention.

Based upon the above Equation 24, temporal changes in Doppler frequency error were observed as in FIG. 5.

FIG. 5 is a view showing a temporal changes in Doppler frequency error according to an exemplary embodiment of the present invention. In this instance, temporal changes in Doppler frequency error were observed in an environment where a plurality of links are formed as shown in FIG. 4, provided that two base stations are at a distance of $D_h=1$ km, the terminal is moving at a velocity of $v=400$ km/h, and the reference clock $f_{RF,BS,LO}$ of the base stations is 27 GHz. Particularly, (A) of FIG. 5 shows changes in Doppler frequency offset for each link when the distance $D_v$ between a base station and a road is 100 m, and B of FIG. 5 shows changes in Doppler frequency offset for each link when the distance $D_v$ between a base station and a road is 1.5 m.

Referring to FIG. 5, it can be seen that the two links (first link and second link) have the same amount of frequency error, but with opposite signs, in nearly all segments. This always applies regardless of whether the terminal moves at a uniform velocity or not. Particularly, the closer the base station is to the road (i.e., the less the distance Dv between the road and the base station), the greater the proportion of these segments. Accordingly, the following condition is established.

$$f_{o,ch,DL1}(t) \approx f_{o,ch,DL2}(t) \quad \text{(Equation 25)}$$

That is, it can be seen that each link has nearly the same amount of frequency error, but with opposite signs.

Based upon Equation 25, Equation 23 related to the sampling frequency during the steady state for the second link can be expressed as follows.

$$f_{s,MT,Link2}(t + \delta) = f_{s,BS}(t) + \dfrac{f_{o,ch,DL2}(t)}{O} \quad \text{(Equation 26)}$$

$$\approx f_{s,BS}(t) - \dfrac{f_{o,ch,DL1}(t)}{O}$$

Accordingly, based upon the above Equation 20 related to the sampling frequency during the steady state for the first link and the above Equation 26 related to the sampling frequency during the steady state for the second link, the channel frequency error in each link can be expressed as follows.

$$f_{o,ch,DL1}(t) = (f_{s,MT,Link1}(t + \delta) - f_{s,MT,Link2}(t + \delta))/2 \quad \text{(Equation 27)}$$

$$\approx f_{o,ch,DL1}(t)$$

-continued $$f_{o,ch,DL2}(t) = (f_{s,MT,Link2}(t + \delta) - f_{s,MT,Link1}(t + \delta))/2$$

$$\approx -(f_{s,MT,Link1}(t + \delta) - f_{s,MT,Link2}(t + \delta))/2$$

$$= -f_{o,ch,DL1}(t)$$

Herein, $f_{o,ch,DL1}(t)$ indicates the channel frequency error for the first link, and $f_{o,ch,DL2}(t)$ indicates the channel frequency error for the second link.

Meanwhile, if the two links operate as a pair, a final sampling frequency can be obtained by summing the sampling frequencies for the two links and dividing the sum by 2.

$$f_{s,MT}(t + \delta) = (f_{s,MT,Link1}(t + \delta) + f_{s,MT,Link2}(t + \delta))/2 \quad \text{(Equation 28)}$$

$$\approx f_{s,BS}(t)$$

Additionally, a frequency can be produced as follows by the subtraction of a specific value. In reality, such a frequency can be produced by choosing either cos or sin.

$$e^{j(\alpha+\beta)} = \begin{bmatrix} \cos(\alpha+\beta) \\ \sin(\alpha+\beta) \end{bmatrix} = \begin{bmatrix} \cos(\alpha)\cos(\beta) - \sin(\alpha)\sin(\beta) \\ \cos(\alpha)\sin(\beta) + \sin(\alpha)\cos(\beta) \end{bmatrix} \quad \text{(Equation 29)}$$

According to an exemplary embodiment of the present invention, a stable sampling frequency can be generated, regardless of the moving velocity of the terminal, even in a high-velocity mobile environment.

Conventionally, the higher the mobility and the wider the baseband bandwidth, the higher the probability that aliasing will occur at a high velocity, thus making it always necessary to use a guard band of a certain width or greater. Nevertheless, according to the exemplary embodiment of the present invention, no aliasing occurs in nearly all segments, even if there is no guard band, since a stable sampling frequency can be generated.

Moreover, in a high-velocity mobile environment, the SNR (signal-to-noise ratio) in the area directly below a cell is not good on the whole. Thus, the condition given by Equation 25 that each link has nearly the same amount of frequency error, but with opposite signs, can be satisfied under the assumption that a handover to a different cell takes place in advance in the vicinity of one cell. In this instance, aliasing does not always occur in all segments.

Accordingly, a guard band can be defined independently of mobility and baseband bandwidth. As a result, data resources actually available for data transmission can be acquired by minimizing the width of the guide band. Therefore, higher data throughput can be achieved. Moreover, a HARQ (hybrid automatic retransmit request) can be used in segments which exhibit poor performance, thereby ensuring operational efficiency in case of errors caused by aliasing.

An apparatus for generating a sampling frequency according to an exemplary embodiment of the present invention will be described based upon the above-described method.

Figure 6:
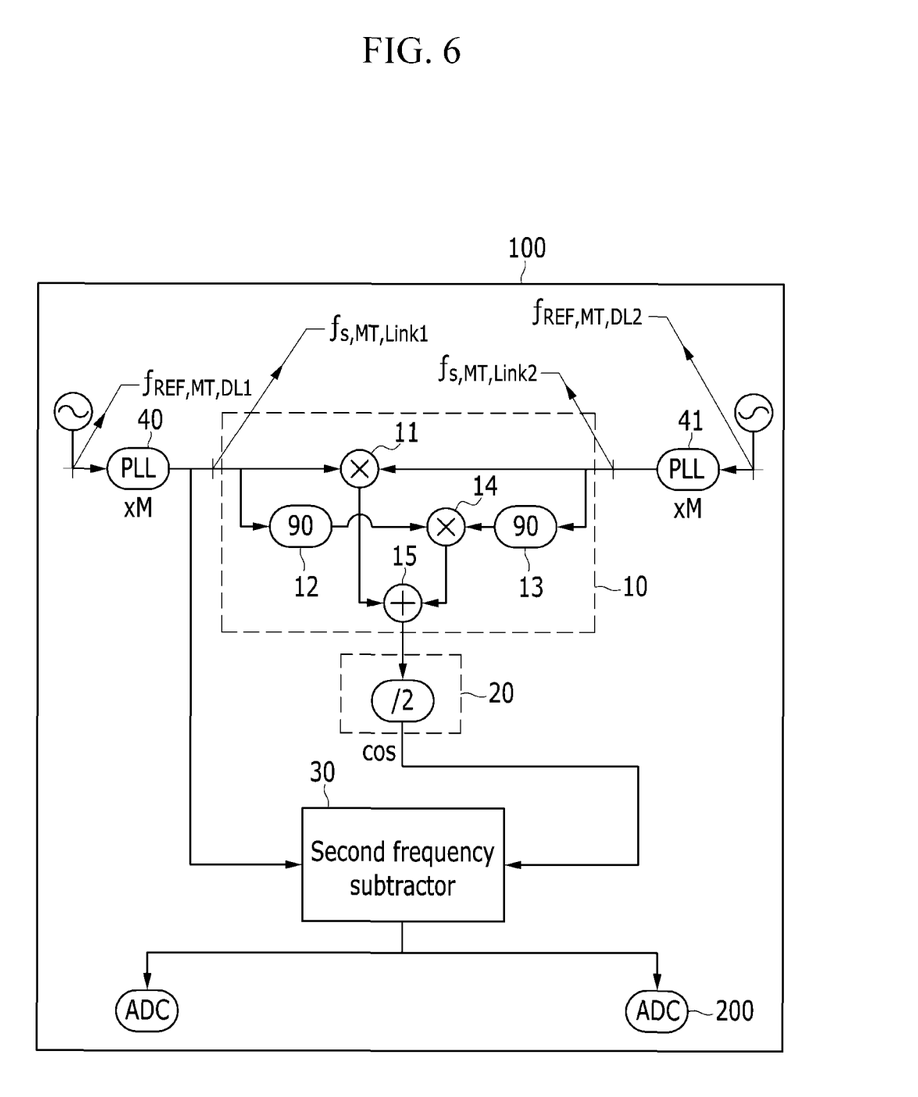
FIG. 6 is a view showing the structure of an apparatus for generating a sampling frequency according to an exemplary embodiment of the present invention.

FIG. 6 is a view showing the structure of an apparatus for generating a sampling frequency according to an exemplary embodiment of the present invention.

As shown in the attached FIG. 6, the sampling frequency generation apparatus 100 according to the exemplary embodiment of the present invention includes a first frequency subtractor 10, a frequency divider 20, and a second frequency subtractor 30.

The first frequency subtractor 10 subtracts sampling frequencies generated based on reference frequencies for multiple links. While two links are taken as an example for explanation, the present invention is not limited to this example.

Specifically, a sampling frequency signal $f_{s,MT,Link1}$ for a first link and a sampling frequency signal $f_{s,MT,Link2}$ for a second link are signals that are generated by multiplying the downlink reference frequency, $f_{REF,MT,DL1}$ or $f_{REF,MT,DL2}$ and which is based on the RF clock received from the base station via the respective links, by a predetermined factor. Alternatively, a sampling frequency signal for each link can be generated by multiplying the RF clock $f_{REF,MT,DL1}$ or $f_{REF,MT,DL2}$ received from the base station by a predetermined factor.

A sampling frequency signal can be generated in various methods, including all the methods of generating a sampling frequency signal by multiplying the clock of a signal received from the base station by an appropriate value.

Not only a sampling frequency signal, but also an RF clock received from the base station or every signal generated by multiplication of the RF clock, can be used as input into the first frequency subtractor 10. Depending on the situation, a component (often referred to as sampling frequency generator) for converting a frequency to a multiple of the sampling frequency before the frequency is input to the ADC can be used.

PLLs 40 and 41 are used to represent multiples of the input and output frequencies, and in some cases, can be replaced by frequency dividers or frequency multipliers. A channel frequency offset is calculated based on the sampling frequency signal (hereinafter referred to as first sampling frequency signal) for the first link and the sampling frequency signal (hereinafter referred to as second sampling frequency signal) for the second link, and the first sampling frequency signal and the second sampling frequency signal are shifted by a value obtained by dividing the channel frequency offset by a predetermined constant (O), thereby obtaining a final sampling frequency. The first frequency subtractor 10 can process a sampling frequency signal based on the above Equation 27.

To this end, the first frequency subtractor 10 includes a first multiplier 11 that produces the first sampling frequency signal multiplied by the second sampling frequency signal, a first delay unit 12 that produces the first sampling frequency signal delayed by a predetermined value, a second delay unit 13 that produces the second sampling frequency signal delayed by a predetermined value, a second multiplier 14 that produces the first sampling frequency signal output from the first delay unit 12 multiplied by the second sampling frequency signal output from the second delay unit 13, and an adder 15 that produces the sum of the signal output from the first multiplier 11 and the signal output from the second multiplier 14. If the PLLs 40 and 41 themselves are able to generate a signal with a phase difference of 90 degrees, the first delay unit 12 and the second delay unit 13 may not be used. The frequency divider 20 divides the frequency signal output from the first frequency subtractor 10 by a predetermined value and produces an output.

Using the first frequency subtractor 10 and the frequency divider 20, a frequency signal with the channel's frequency offset component, particularly consisting of cosine and sine functions, can be generated.

The second frequency subtractor 30 performs an operation on the signal output from the frequency divider and the sampling frequency signal (first sampling frequency signal or second sampling frequency signal) for each link, and produces a final, stable sampling frequency signal (hereinafter referred to as a final sampling signal). For instance, the second frequency subtractor 30 subtracts the output signal of the frequency divider 20 from the first sampling frequency $f_{s,MT,Link1}$ output from the PLL 40 and input to the first frequency subtractor 10, and produces a final sampling signal for the first link. Likewise, the second frequency subtractor 30 subtracts the output signal of the frequency divider 20 from the second sampling frequency $f_{s,MT,Link2}$ output from the PLL 41 and input to the first frequency subtractor 10, and produces a final sampling signal for the second link.

The operation of producing a final sampling signal may be performed for each link, as above, or for a chosen link.

As stated above, a final sampling signal output from the second frequency subtractor 30 is delivered to the ADC 200 for converting an analog signal into a digital signal, and is used for sampling.

Figure 7:
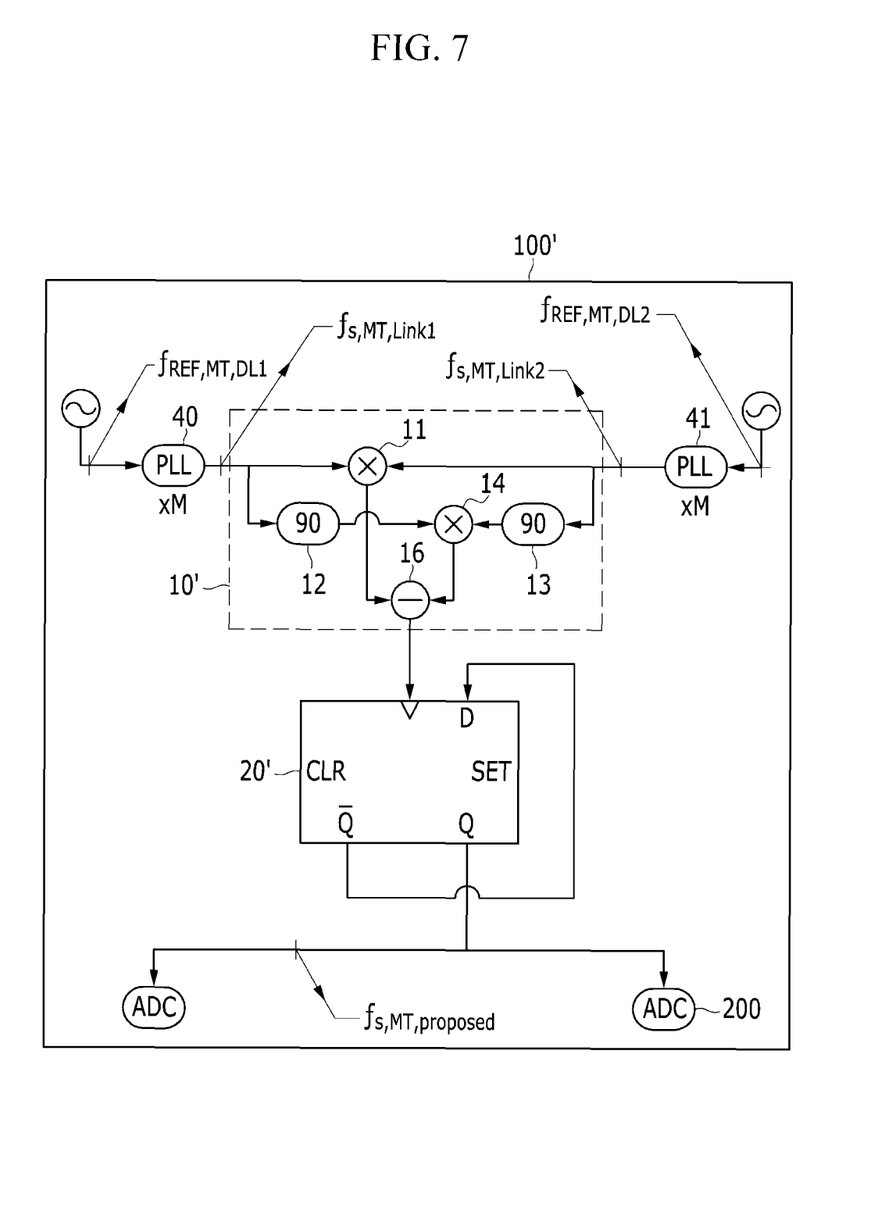
FIG. 7 is a view showing the structure of an apparatus for generating a sampling frequency according to another exemplary embodiment of the present invention.

FIG. 7 is a view showing the structure of an apparatus for generating a sampling frequency according to another exemplary embodiment of the present invention. This figure depicts the structure of an apparatus for generating a sampling frequency when a pair of links are used.

As shown in the attached FIG. 7, the sampling frequency generation apparatus 100' according to another exemplary embodiment of the present invention includes a first frequency subtractor 10' and a frequency divider 20'.

While two links are taken as an example for explanation, the present invention is not limited to this example.

Like in the foregoing embodiment, the first frequency subtractor 10' receives a first sampling frequency signal $f_{s,MT,Link1}$ and a second sampling frequency signal $f_{s,MT,Link2}$ and calculates a channel frequency offset, and shifts the first sampling frequency and the second sampling frequency by a value obtained by dividing the channel frequency offset by a predetermined constant (O), thereby obtaining a final sampling frequency.

To this end, like in the foregoing embodiment, the first frequency subtractor 10' includes a first multiplier 11 that produces the first sampling frequency signal multiplied by the second sampling frequency signal, a first delay unit 12 that produces the first sampling frequency signal delayed by a predetermined value, a second delay unit 13 that produces the second sampling frequency signal delayed by a predetermined value, and a second multiplier 14 that produces the first sampling frequency signal output from the first delay unit 12 multiplied by the second sampling frequency signal output from the second delay unit 12. Unlike the foregoing embodiment, the first frequency subtractor 10 includes a subtractor 16 that performs a subtraction on the signal output from the first multiplier 11 and the signal output from the second multiplier 14.

The sampling frequency signals are processed based on the above Equation 28, and it can be seen that the result obtained by summing the sampling frequency signals for the two links and dividing the sum of the two signals according to Equation 28 is equal to the sampling frequency of the ADC. Accordingly, the frequency divider 20' is a digital divider to generate a digital clock immediately after frequency addition. Hence, an output signal of the first frequency subtractor 10' is fed to an input terminal (D F/F) of the frequency divider 20', and the frequency divider 20' generates a final sampling frequency signal, i.e., clock signal, based on the signal output from the first frequency subtractor 10' and delivers it to the ADC 200.

The structure of an apparatus for generating a sampling frequency according to an exemplary embodiment of the present invention is not limited to those described above, and may be realized in various forms that will satisfy the above-described method according to an exemplary embodiment of the present invention.

According to an embodiment of the present invention, a stable sampling frequency can be generated, regardless of moving velocity, even in a high-velocity mobile environment by using results of AFC (auto frequency control).

Conventionally, the higher the mobility and the wider the baseband bandwidth, the higher the probability that aliasing will occur at a high velocity, thus making it always necessary to use a guard band of a certain width or greater. Nevertheless, according to the exemplary embodiment of the present invention, no aliasing occurs in nearly all segments, even if there is no guard band, since a stable sampling frequency can be generated. Accordingly, a guard band can be defined independently of mobility and baseband bandwidth. Moreover, data resources actually available for data transmission can be acquired by minimizing the width of the guide band. Therefore, higher data throughput can be achieved, compared to the conventional technology.

In addition, a HARQ (hybrid automatic retransmit request) can be used in segments which exhibit poor performance, thereby ensuring operational efficiency in case of errors caused by aliasing.

The exemplary embodiments of the present invention are implemented not only through the apparatus and method, but may be implemented through a program that realizes functions corresponding to constituent members of the exemplary embodiments of the present invention or a recording medium in which the program is recorded. The implementation will be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a mobile terminal for generating a sampling frequency in order for the mobile terminal to sample a received signal, the method comprising:
   extracting a frequency offset in a channel from an entire frequency offset;
   calculating an amount of shift by dividing the extracted frequency offset by a predetermined value;
   providing a predetermined signal with a frequency which is a predetermined multiple of a reference clock derived from a signal received from a base station; and
   obtaining a final sampling frequency by shifting the frequency of the predetermined signal by the amount of shift.

2. The method of claim 1, wherein extracting the frequency offset comprises extracting a Doppler frequency offset from the entire frequency offset.

3. The method of claim 2, wherein the Doppler frequency offset is caused by a moving velocity of the mobile terminal.

4. A method for generating a sampling frequency in order for a terminal to sample a received signal, the method comprising:
   extracting a frequency offset in a channel from an entire frequency offset;
   calculating an amount of shift by dividing the extracted frequency offset by a predetermined value; and
   obtaining a final sampling frequency by shifting the frequency of a predetermined signal by the amount of shift,
   wherein the extracting of a frequency offset comprises the terminal extracting a frequency offset for each of multiple links connected to multiple base stations.

5. The method of claim 4, wherein the calculating of the amount of shift comprises calculating the amount of shift for each link by dividing the frequency offset for each link by a predetermined value, and the obtaining of the final sampling frequency comprises obtaining a sampling frequency for each link by shifting the frequency of the predetermined signal by the amount of shift for each link.

6. The method of claim 5, wherein the obtaining of the final sampling frequency further comprises obtaining the final sampling frequency by summing the sampling frequencies for respective links and dividing the sum by a predetermined constant.

7. The method of claim 6, wherein the predetermined constant is the number of links.

8. An apparatus for a mobile terminal for generating a sampling frequency in order for the mobile terminal to sample a received signal, the apparatus comprising:
   a first frequency subtractor that receives sampling frequency signals generated based on reference frequencies derived from signals received from base stations for multiple links and produces a sum of the sampling frequency signals;
   a frequency divider that divides a frequency signal output from the first frequency subtractor by a predetermined value and produces an output; and
   a second frequency subtractor that performs an operation on the output from the frequency divider and the sampling frequency for each link, and produces a final sampling frequency signal for each link;
   such that the final sampling frequency signal for each link is stable.

9. The apparatus of claim 8, wherein the first frequency subtractor obtains a sampling frequency signal by shifting the sampling frequency signals for respective links by a value obtained by dividing a channel frequency offset by a predetermined constant.

10. The apparatus of claim 9, wherein the first frequency subtractor comprises:
    a first multiplier that produces a first sampling frequency signal for a first link multiplied by a second sampling frequency signal for a second link;
    a second multiplier that multiplies the first sampling frequency signal shifted by a predetermined value by the second sampling frequency signal shifted by a predetermined value and produces an output; and
    an adder that produces a sum of the signal output from the first multiplier and the signal output from the second multiplier.

11. The apparatus of claim 10, further comprising:
    a first delay unit that produces the first sampling frequency signal delayed by a predetermined value and outputs the same to the second multiplier; and
    a second delay unit that produces the second sampling frequency signal delayed by a predetermined value and outputs the same to the second multiplier.

12. The apparatus of claim 9, wherein the sampling frequency signal for each link is a signal of which frequency is a predetermined multiple of a reference clock received from a base station.

13. The apparatus of claim 10, wherein the second frequency subtractor subtracts the first sampling frequency input to the first frequency subtractor from the output from the frequency divider and produces a final sampling signal for the first link, and subtracts the second sampling frequency signal input to the first frequency subtractor from the output from the frequency divider and produces a final sampling signal for the second link.

14. The apparatus of claim 9, wherein the frequency divider divides a signal by a predetermined value corresponding to the number of links.

15. An apparatus for a mobile terminal for generating a sampling frequency in order for the mobile terminal to sample a received signal, the apparatus comprising:
  a first frequency subtractor that receives sampling frequency signals generated based on reference frequencies derived from signals received from base stations for multiple links and produces a sum of the sampling frequency signals; and
  a frequency divider that divides a frequency signal output from the first frequency subtractor by a predetermined value and produces a final sampling frequency signal, the first frequency subtractor comprising:
    a first multiplier that produces a first sampling frequency signal for a first link multiplied by a second sampling frequency signal for a second link;
    a second multiplier that multiplies the first sampling frequency signal shifted by a predetermined value by the second sampling frequency signal shifted by a predetermined value and produces an output; and
    a subtractor that performs a subtraction on the signal output from the first multiplier and the signal output from the second multiplier;
  such that the final sampling frequency signal for each link is stable.

16. The apparatus of claim 15, wherein the first link and the second link operate as a pair.

17. The apparatus of claim 15, wherein the sampling frequency signal for each link is a signal of which frequency is a predetermined multiple of a reference clock received from a base station.

18. The apparatus of claim 15, wherein the frequency divider divides a signal by a predetermined value corresponding to the number of links.

* * * * *